June 26, 1951  F. N. BARD  2,557,930
JOINT
Filed June 12, 1947  2 Sheets-Sheet 1
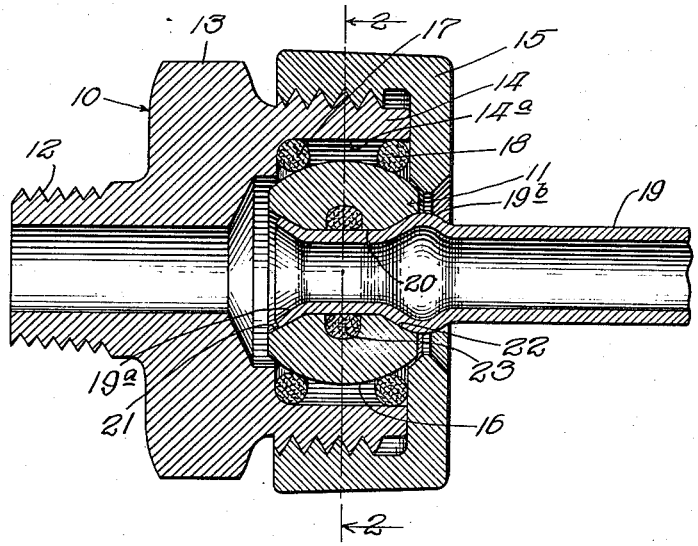
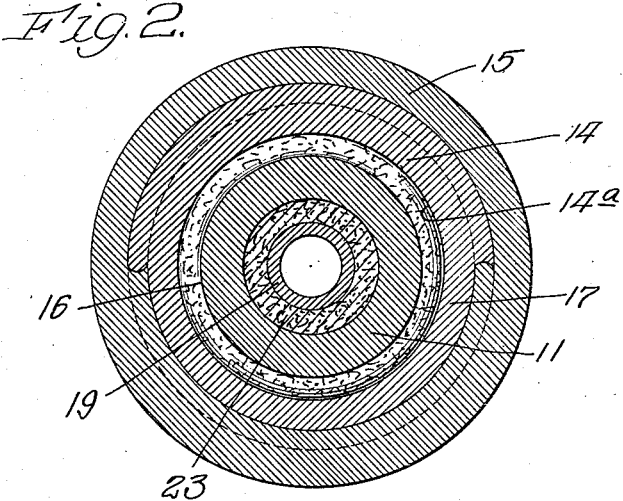
Inventor:
Francis N. Bard,
By Clinton, Schroeder, Merriam & Hofgren,
Attys.

June 26, 1951

F. N. BARD 2,557,930

JOINT

Filed June 12, 1947

2 Sheets-Sheet 2

Inventor:
Francis N. Bard,
By Christon, Schroeder, Merriam & Hofgren,
Attys.

Patented June 26, 1951

2,557,930

UNITED STATES PATENT OFFICE 2,557,930

JOINT

Francis N. Bard, Highland Park, Ill.

Application June 12, 1947, Serial No. 754,181

6 Claims. (Cl. 285—95)

This invention relates to a joint, and more particularly to a ball joint designed for use with a resilient packing.

Figure 3:
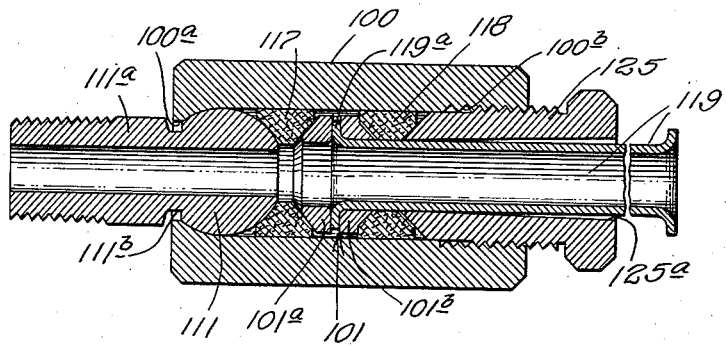
Figure 4:
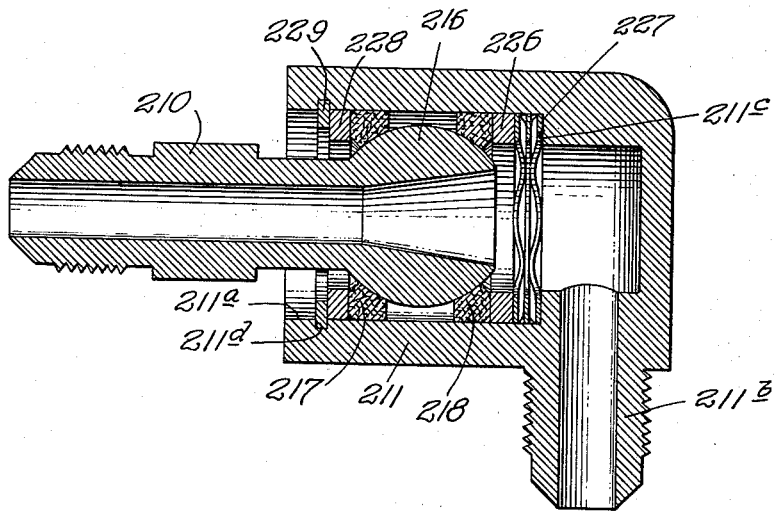

One feature of this invention is that it provides an improved ball joint that is very simple but quite satisfactory; another feature of this invention is that it provides a ball joint having resilient packing associated therewith so that movement for vibration absorption is provided which has a distinct angularity yet the ball will not move relative to the surface of the packing until this angularity has been exceeded; still another feature of this invention is that it provides a joint designed for and particularly useful in situations where vibration would otherwise quickly fatigue the tubing at the connection and result in breakage of the connection; another feature of this invention is that it obviates the need of threading the section of conduit to which the joint is designed to be connected; yet another feature of this invention is that the joint may be very readily and conveniently assembled and attached to the section of tubing or the like with which it is to be used; and a further feature of this invention is that a good seal is maintained between the section of tube and the casing members without the need of any especially high degree of precision in the manufacture of the joint. Other features and advantages of this invention will be apparent from the following specification and the drawings, in which:

Fig. 1 is a vertical sectional view of one embodiment of my invention and a fragment of tubing to which it is connected, this view being along the axis of the joint and tubing; Fig. 2 is a transverse sectional view along the line 2—2 of Fig. 1; Fig. 3 is a vertical sectional view similar to Fig. 1 of another embodiment of the invention; and Fig. 4 is a vertical sectional view similar to Fig. 1 of a third embodiment of the invention.

There are, of course, innumerable situations where a ball joint is desirable in connecting one section of conduit to another, or to some device to which it is to be connected, particularly where there is some relative movement between the connected parts, whether intentional or as a result of vibration. I am here disclosing and claiming a ball joint which has the usual advantage of a ball joint in permitting angular movement between the parts which it connects, and which includes a resilient packing bearing against the ball so that there is provided a movement for vibration absorption which has a distinct angularity yet the ball will not move relative to the surface of the packing until this angularity has been exceeded.

In the particular embodiment of my invention illustrated in Figs. 1 and 2, the joint comprises as its two principal elements an outer or casing member here identified in general as 10 and an inner or ball member here identified in general as 11. The casing is here shown as provided at one end with a threaded portion 12 adapted to be threaded into a suitable opening in a device of any character to which connection is to be made; a body portion 13, which may have a hexagonal perimeter to facilitate screwing the casing section into the device in which the joint is used; and a projecting portion 14, exterior adapted to be engaged by the threaded inner surface to a nut 15 adapted to hold the joint parts in assembled relation, as may be seen in Figure 1.

The inner or ball member 11 has a partially spherical outer surface 16. The outer part of the joint is provided adjacent each end of the cylindrical surface 14a with inwardly extending shoulders or radial surfaces, the one to the left as the parts are viewed in Figure 1 being a shoulder in the casing and the one to the right being provided by the inwardly extending portion of the nut. Two spaced gasket rings or annular packing members of quite soft and resilient material, as synthetic rubber or the like, and preferably of circular cross section as illustrated, lie between the outer surface of the ball member 11 and the inner surfaces of the casing section or part of the joint, these being here identified as 17 and 18. By providing the outer casing part of the joint with the ring angle intersections between the shoulders and the cylindrical surface 12a, and by spacing the packing members 17 and 18 well to each side of the center of curvature of the outer surface of the ball member 11, the packing members maintain their position well despite movements of the ball member, permitting such movement while at the same time maintaining a good seal between the joint parts.

The ball member 11 has a central bore or opening therethrough adapted to receive the end of the section of conduit to which connection is made, this being here shown as the piece of tubing 19. The inner surface of the ball member 11 has a central portion with a diameter preferably just slightly greater than the exterior diameter of the tubing section 19, this portion being here identified as 20, and outwardly flared or diverging end portions here identified as 21 and 22. These end portions of the inner surface of the ball member 11 are adapted to have adjacent portions of the tubing expanded thereagainst, as the tubing portions identified as 19a and 19b. This expansion of the tubing is effected by an appropriate flaring or expanding tool, not illustrated since it forms no part of the present invention. The tubing is generally of copper, relatively soft steel, or similar readily deformable metal. When the tubing has been expanded or deformed as illustrated it is mechanically locked in place in the ball member 11.

In order to provide a suitable fluid tight seal between the tubing and the inner surface of the ball member I prefer to provide an annular groove 23 in the central portion of the inner surface of the ball member 11, and to use another gasket ring or annular packing member, as of synthetic rubber and circular cross section, in this groove, the depth of the groove preferably being so proportioned to the unstressed cross sectional diameter of the packing member that the same is substantially deformed, as illustrated, when the tubing is in place in the ball member in order to provide a good seal between these parts.

In the embodiment shown in Fig. 3, the joint comprises an outer joint member 100 in the approximate form of a cylinder and an inner joint member 101. The inner joint member is formed of two separate, but cooperating, annular rings 101a and 101b. These rings are adapted to hold between them the end of a piece of tubing 119. The inner end of this tubing is flared outwardly to provide an annular flange 119a. This flange is held between the two portions 101a and 101b. Abutting against the outer surface of the portion 101a, there is located an annular resilient gasket ring 117. Abutting against the outer surface of the portion 101b is a similar annular gasket ring 118. Each of the gasket rings 117 and 118 are wedge-shaped in cross section with the small ends of the wedges being on the inner surfaces thereof; and they are both of relatively soft, quite resilient material, as synthetic rubber. The gasket ring 118 is adapted to extend between the inner surface of the outer joint member 100 and the outer surface of the tubing 119.

Within the end of the outer joint member 100, which is opposite the end holding the tubing 119, there is located a ball member 111. This ball member bears against an annular flange 100a formed at the end of the outer joint member 100 in which the ball member is located. The ball member is provided with a stem 111a which may be threaded for connection to a conduit and the portion of the stem adjacent the ball has an annular recess portion 111b opposite the outer member flange 100a. This permits a substantial degree of angular movement of the ball member with respect to the outer casing member 100.

The ball member extends between the flange 100a and the first gasket ring 117. Thus, the gasket 117 serves to seal the space between the ball member and the outer casing member while the gasket 118 serves to seal the space between the tubing 119 and the outer casing member. In order that the various parts of the joint will be held in sealing relationship, the inner surface of the tubing end of the outer casing member is threaded as indicated at 100b. These threads are arranged to engage and hold threads on the outer surface of an annular plug member 125. This plug member is ordinarily substantially concentric with respect to the tubing 119 as well as the outer casing member 100. The inner end of the plug member is adapted to bear against the second gasket ring 118 and thus can hold all the inner elements of the joints tightly in sealing relationship. The inner surface 125a of the plug member 125 is provided with a gradually increasing diameter from the inner end of the plug member to the outer end thereof. This permits a substantial degree of vibration or other movement in the tubing 119.

In the embodiment shown in Fig. 4, the joint comprises an inner joint member 210 and an outer joint 211. The inner joint member 210 is provided with a spherical or ball portion 216 that is adapted to be held within a cavity 211a in the outer joint member. The outer joint member has a portion 211b which may be threaded or otherwise arranged for connection to a conduit. The free end of the inner joint member 210 may also be threaded or otherwise arranged for connection with another conduit.

Two spaced gasket rings or annular packing members 217 and 218 of quite resilient material, as synthetic rubber, lie between the outer surface of the ball portion 216 and the inner surface of the outer joint portion 211. The inner packing ring 218 is arranged to bear against a spacer ring 226 which in turn bears against a spring packing 227 that is held in position by an annular shoulder 211c formed in the outer casing member 211. The outer gasket 217 bears against an outer spacer ring 228 which in turn is held by a spring ring 229 located in an annular groove 211d in the inner surface of the outer joint member 211. The spring ring 227 serves to provide constant pressure on the assembly and hold the gasket rings 217 and 218 in sealing relationship with the ball 216 and the outer joint member 211.

In all three forms of the invention, resilient packing members are used in conjunction with a ball. Because of the resiliency of the packing member, a substantial degree of angular movement of the ball is permitted without the ball moving relative to the packing members. This prevents excessive wear in the joint members as the motion is absorbed by the packing.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A joint of the character described, including: an outer joint member; an annular inner joint member, said members being arranged for angular movement relative to each other; and relatively soft and resilient packing means between said members, said packing means being readily deformable and being so located as to be out of contact with both joint parts throughout a substantial portion of its cross-section periphery so that a substantial amount of vibration is absorbed by the packing means without movement of either member relative to the contacted portion of the packing means.

2. A joint of the character described, including: an outer joint member; an annular inner joint member, the outer surface of this member being partially spherical; and two separate annular relatively soft and resilient packing members between the inner and outer joint member, said packing members lying on opposite sides of the center of said spherical outer surface part, each packing member being readily deformable and being so located as to be out of contact with both joint parts throughout a substantial portion of its cross-section periphery, so that a substantial amount of vibration is absorbed by the packing members without movement of either joint member relative to the contacted portion of the packing members.

3. A joint of the character described, including: an outer joint member; an annular inner joint member adapted to receive the end of a piece of tubing therewithin, the inner surface of this member having a central portion with a diameter approximately equal to the external diameter of the tubing and outwardly flared end portions adapted to have adjacent portions of the tubing expanded thereagainst, the central portion having an annular groove therein; relatively soft and resilient packing means between the inner member and the tubing, this packing lying in said groove.

4. A joint of the character described, including: an outer joint member; an annular inner joint member adapted to receive the end of a piece of tubing therewithin, the outer surface of this member being partially spherical and the inner surface of this member having a central portion with a diameter approximately equal to the external diameter of the tubing and outwardly flared end portions adapted to have adjacent portions of the tubing expanded thereagainst; relatively soft and resilient packing means between the inner and outer joint member; and relatively soft and resilient packing means between the inner member and the tubing.

5. A joint of the character described, including: an outer joint member; an annular inner joint member adapted to receive the end of a piece of tubing therewithin, the outer surface of this member being partially spherical and the inner surface of this member having a central portion with a diameter approximately equal to the external diameter of the tubing and outwardly flared end portions adapted to have adjacent portions of the tubing expanded thereagainst, the central portion having an annular groove therein; two separate annular relatively soft and resilient packing means between the inner and outer joint member, said packing members lying on opposite sides of the center of said spherical outer surface part, each packing member being readily deformable and being so located as to be out of contact with both joint parts throughout a substantial portion of its cross-section periphery, so that a substantial amount of vibration is absorbed by the packing members without movement of either joint member relative to the contacted portion of the packing members; and relatively soft and resilient packing means between the inner member and the tubing, this packing lying in said groove.

6. A joint part comprising an annular member having a partially spherical outer surface and an inner surface having a central portion with an annular groove therein and flared outwardly at each end.

FRANCIS N. BARD.

REFERENCES CITED

The following references are of record in the file of this patent:

UNITED STATES PATENTS

| Number | Name | Date |
|---|---|---|
| 807,768 | Otis | Dec. 19, 1905 |
| 871,757 | Greenlaw | Nov. 19, 1907 |
| 954,177 | Fleming | Apr. 5, 1910 |
| 1,001,117 | Adreon | Aug. 22, 1911 |
| 1,034,965 | Bradley | Aug. 6, 1912 |
| 2,388,633 | De Woody | Nov. 6, 1945 |
| 2,421,691 | Gibson et al. | June 3, 1947 |